United States Patent
Li et al.

(10) Patent No.: US 9,396,220 B2
(45) Date of Patent: Jul. 19, 2016

(54) INSTANTANEOUS UNPLUG OF PLUGGABLE DATABASE FROM ONE CONTAINER DATABASE AND PLUG INTO ANOTHER CONTAINER DATABASE

(71) Applicant: Oracle International Corporation, Redwood Shores, CA (US)

(72) Inventors: Yunrui Li, Fremont, CA (US); Kumar Rajamani, San Ramon, CA (US); Giridhar Ravipati, Foster City, CA (US); Chi Cao Minh, San Mateo, CA (US); Jaebock Lee, Sunnyvale, CA (US); Sanket Jain, Sunnyvale, CA (US); Jonghyun Lee, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 251 days.

(21) Appl. No.: 14/202,091

(22) Filed: Mar. 10, 2014

(65) Prior Publication Data
US 2015/0254240 A1    Sep. 10, 2015

(51) Int. Cl.
*G06F 17/30*    (2006.01)
(52) U.S. Cl.
CPC ........ *G06F 17/303* (2013.01); *G06F 17/30371* (2013.01); *G06F 17/30575* (2013.01)
(58) Field of Classification Search
USPC ........................................................ 707/620
See application file for complete search history.

(56) References Cited

U.S. PATENT DOCUMENTS

| | | | |
|---|---|---|---|
| 6,185,699 B1 * | 2/2001 | Haderle | G06F 9/466 714/19 |
| 6,205,449 B1 * | 3/2001 | Rastogi | G06F 11/1471 |
| 6,226,650 B1 | 5/2001 | Mahajan | |
| 6,295,610 B1 * | 9/2001 | Ganesh | G06F 11/1474 707/999.202 |
| 6,804,671 B1 | 10/2004 | Loaiza et al. | |
| 7,305,421 B2 * | 12/2007 | Cha | G06F 11/1471 |
| 7,822,717 B2 * | 10/2010 | Kapoor | G06F 11/1469 707/680 |
| 8,117,174 B2 * | 2/2012 | Shaughnessy | G06F 17/30371 707/704 |
| 8,364,648 B1 * | 1/2013 | Sim-Tang | G06F 17/30368 707/674 |
| 8,478,718 B1 | 7/2013 | Ranade | |
| 9,026,679 B1 | 5/2015 | Shmuylovich | |
| 2002/0112022 A1 | 8/2002 | Kazar et al. | |

(Continued)

OTHER PUBLICATIONS

Dominic Betts et al., "Developing Multi-Tenant Applications for the Cloud," 3rd Edition, Microsoft, 2012, 246 pages.

(Continued)

*Primary Examiner* — Hanh Thai
(74) *Attorney, Agent, or Firm* — Hickman Palermo Becker Bingham, LLP; Marcel K. Bingham (57) ABSTRACT

A pluggable database is transported between a source DBMS and a destination DBMS, in a way that minimizes downtime of the pluggable database. While a copy of the pluggable database is being made at the destination DBMS, transactions continue to execute against the pluggable database at the source DBMS and change the pluggable database. Eventually, the transactions terminate or cease executing. Redo records generated for the transactions are applied to the copy of the pluggable database at the source DBMS. Undo records generated for at least some of the transactions may be stored in a separate undo log and transported to the destination DBMS. The transported pluggable database is synchronized at a destination DBMS in a "pluggable-ready state", where it may be plugged into the destination container DBMS.

24 Claims, 5 Drawing Sheets

(56) References Cited

U.S. PATENT DOCUMENTS

| | | | |
|---|---|---|---|
| 2002/0143733 A1* | 10/2002 | Mukkamalla | G06F 17/30592 |
| 2003/0061537 A1 | 3/2003 | Cha et al. | |
| 2004/0039962 A1* | 2/2004 | Ganesh | G06F 11/1474 |
| | | | 714/16 |
| 2004/0054643 A1* | 3/2004 | Vemuri | G06F 17/30371 |
| 2004/0054644 A1* | 3/2004 | Ganesh | G06F 17/30371 |
| 2004/0177099 A1* | 9/2004 | Ganesh | G06F 11/1471 |
| 2004/0210577 A1* | 10/2004 | Kundu | G06F 17/30368 |
| 2004/0267809 A1 | 12/2004 | East et al. | |
| 2005/0038831 A1 | 2/2005 | Souder et al. | |
| 2006/0047713 A1 | 3/2006 | Gornshtein | |
| 2007/0100912 A1* | 5/2007 | Pareek | G06F 11/1466 |
| 2007/0244918 A1 | 10/2007 | Lee et al. | |
| 2010/0318570 A1 | 12/2010 | Narasinghanallur et al. | |
| 2011/0004586 A1 | 1/2011 | Cherryholmes et al. | |
| 2011/0060724 A1 | 3/2011 | Chan | |
| 2011/0087633 A1 | 4/2011 | Kreuder et al. | |
| 2011/0307450 A1* | 12/2011 | Hahn | G06F 17/30339 |
| | | | 707/649 |
| 2012/0109926 A1 | 5/2012 | Novik et al. | |
| 2012/0278282 A1 | 11/2012 | Lu | |
| 2012/0284228 A1 | 11/2012 | Ghosh | |
| 2012/0323849 A1* | 12/2012 | Garin, Jr. | G06F 17/30575 |
| | | | 707/617 |
| 2013/0085742 A1 | 4/2013 | Barker et al. | |
| 2013/0117237 A1 | 5/2013 | Thomsen et al. | |
| 2013/0198133 A1 | 8/2013 | Lee | |
| 2013/0212068 A1 | 8/2013 | Talius et al. | |
| 2014/0095452 A1* | 4/2014 | Lee | G06F 11/1471 |
| | | | 707/683 |
| 2014/0095530 A1 | 4/2014 | Lee et al. | |
| 2014/0095546 A1 | 4/2014 | Kruglikov et al. | |
| 2014/0164331 A1* | 6/2014 | Li | G06F 11/1471 |
| | | | 707/648 |
| 2015/0032694 A1 | 1/2015 | Rajamani et al. | |
| 2015/0120659 A1* | 4/2015 | Srivastava | G06F 11/14 |
| | | | 707/625 |

OTHER PUBLICATIONS

Rajeev Kumar et al., Oracle DBA, A Helping Hand, Container Database and Pluggable Database (CDB & PDB), retrieved from the internet on Dec. 4, 2013, 2 pages.

Preimesberger, Chris, "Oracle Profits Up, but Revenues Slip" Oracle, dated Sep. 20, 2012, 2 pages.

Oracle Base Multitenant: Create and Configurea Pluggable Database (PDB) In Orace Database 12c Release 1 (12.1), dated Jan. 8, 2014, 16 pages.

Garcia-Molina et al., "Database System Implementation", dated Jan. 1, 2000, 84 pages.

Francisco Munoz et al., "Oracle Database 12c Backup and Recovery Survival Guide", dated Sep. 24, 2013, 8 pages.

Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.

Anonymous: "Oracle-Base—Multitenant: Overview of Container Databases (CDB) and Pluggable Databases (PDB)", dated Mar. 3, 2014, 4 pages.

Anonymous, :An Oracle White Paper Oracle Database Appliance: Migration Strategies, dated Jun. 2012, 14 pages.

U.S. Appl. No. 13/631,815, filed Sep. 28, 2012, Office Action, May 29, 2014.

U.S. Appl. No. 13/950,207, filed Jul. 24, 2013, Office Action, Dec. 11, 2015.

U.S. Appl. No. 13/830,349, filed Mar. 14, 2013, Notice of Allowance, Oct. 19, 2015.

Muhammad Anwar, "How to Install Oracle 12c Multitenant Pluggable Database", Dated Feb. 24, 2012, 27 pages.

U.S. Appl. No. 13/841,272, filed Mar. 15, 2013, Restriction Requirement, Jan. 8, 2015.

U.S. Appl. No. 13/830,349, filed Mar. 14, 2013, Office Action, Nov. 5, 2014.

U.S. Appl. No. 13/631,815, filed Sep. 28, 2012, Office Action, Nov. 6, 2014.

* cited by examiner

INSTANTANEOUS UNPLUG OF PLUGGABLE DATABASE FROM ONE CONTAINER DATABASE AND PLUG INTO ANOTHER CONTAINER DATABASE

CROSS-REFERENCE TO RELATED APPLICATIONS

Benefit Claim

This application is related to U.S. application Ser. No. 13/631,815, filed on Sep. 28, 2012 by Jaebock Lee, et al., U.S. application Ser. No. 13/841,272, filed on Mar. 15, 2013 by Andre Kruglikov et al., U.S. application Ser. No. 13/830,349, filed on Mar. 14, 2013 by J. William Lee et al., and U.S. application Ser. No. 13/950,207, filed Jul. 24, 2013, by Vasanth Rajamani et al. The U.S. Applications listed in this paragraph are incorporated herein by reference.

FIELD OF THE INVENTION

The present invention relates to database system consolidation, and in particular, transporting databases between database systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database consolidation involves distributing and sharing computer resources of a hardware platform among multiple databases. Among important objectives of database consolidation is transportability. Transportability is the ability to efficiently move databases between hosts. Transportability facilities distribution of computer resources between databases being consolidated.

Described herein are techniques for improving transportability.

DETAILED DESCRIPTION

In the following description, for the purpose of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

Described herein are approaches for transporting databases between container database management systems ("container DBMS"). A container DBMS manages a container database. The container database may contain multiple separate isolated databases, which are referred to herein as pluggable databases. Each pluggable database is defined by its own separate database dictionary and is isolated to an extent from other pluggable databases within the container database.

A pluggable database is transported between a source DBMS and a destination DBMS, in a way that minimizes downtime of the pluggable database. While a copy of the pluggable database is being made at the destination DBMS, transactions continue to execute against the pluggable database at the source DBMS and change the pluggable database. Eventually, the transactions terminate or cease executing. Redo records generated for the transactions are applied to the copy of the pluggable database at the source DBMS. Undo records generated for at least some of the transactions may be stored in a separate undo log and transported to the destination DBMS. The transported pluggable database is synchronized at a destination DBMS to a "pluggable-ready state", where it may be plugged into the destination container DBMS.

Container Database Management System

Figure 1A:
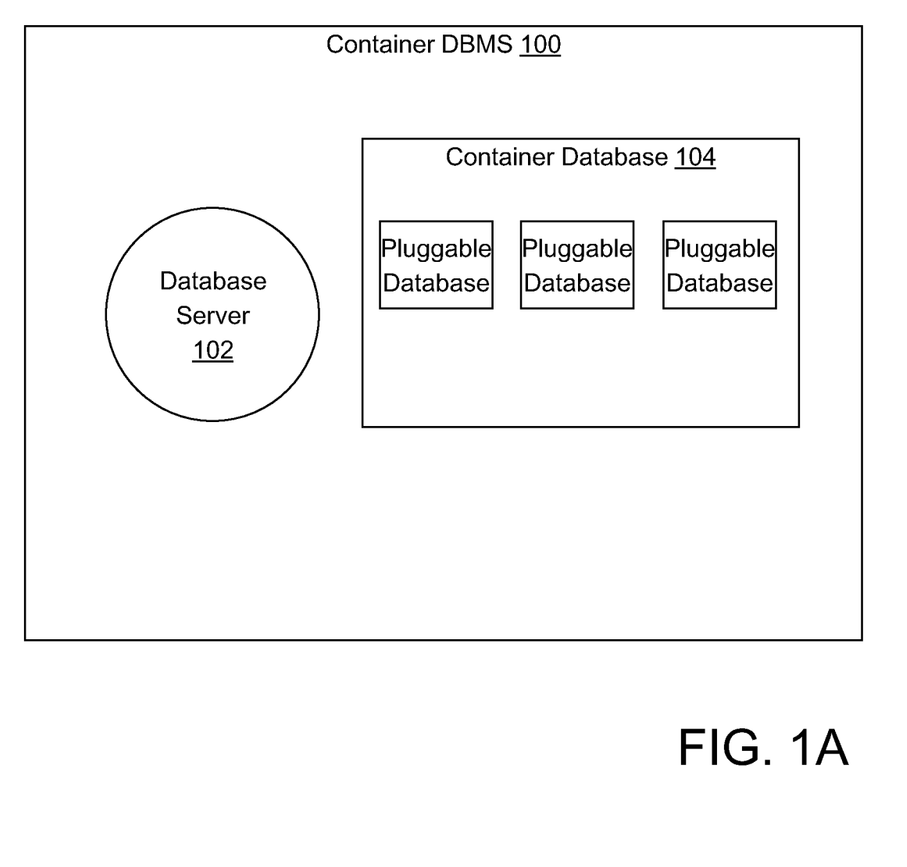
FIG. 1A is a diagram depicting a container DBMS according to an embodiment of the present invention.

FIG. 1A depicts an example DBMS upon which an embodiment may be implemented. Referring to FIG. 1A, it depicts Container DBMS 100, which comprises Database Server 102 and Container Database 104, which contains multiple pluggable databases. Database Server 102 manages Container Database 104 and the pluggable databases contained in Container Database 104.

Database Server 102 represents a combination of software and resources on one or more computer systems that manage Container Database 104. An example of a database server and computer system upon which a database server may run is described below in the section DATABASE SYSTEM OVERVIEW, although an embodiment of the present invention is not so limited. Although FIG. 1A only depicts a particular number of each element, an embodiment may have many more of each of the elements illustrated in FIG. 1A.

Figure 1B:
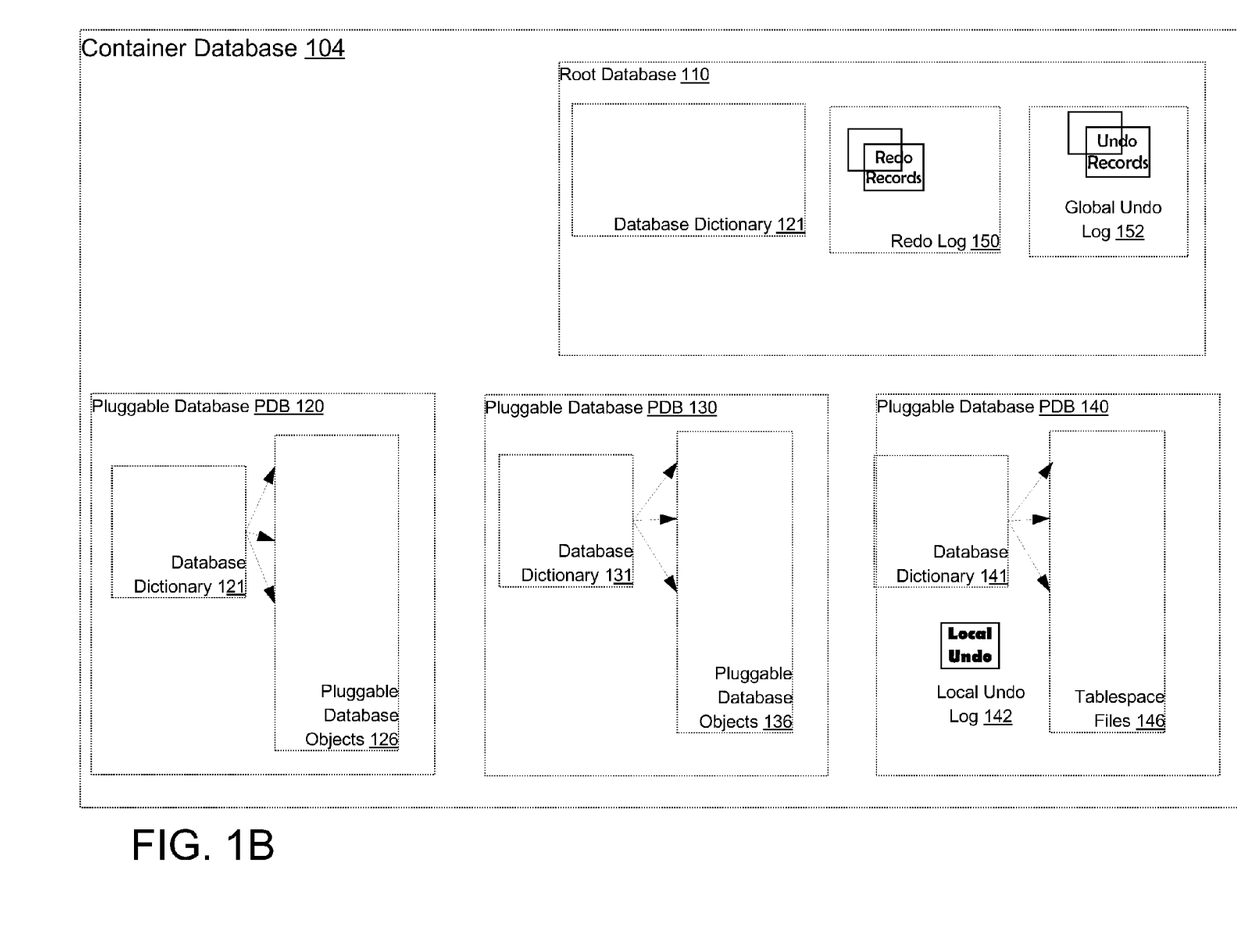
FIG. 1B is a diagram depicting a container DBMS according to an embodiment of the present invention.

FIG. 1B depicts a more detailed view of Container Database 104 according to an embodiment of the present invention. Container Database 104 contains multiple databases that are hosted and managed by Database Server 102. The databases include Pluggable Database PDB 120, Pluggable Database PDB 130, Pluggable Database PDB 140, and Root Database 110. Root Database 110 is a database that is used by Database Server 102 to globally manage Container Database 104, and to store metadata that defines pluggable databases and/or that defines "common database objects" that are accessible to users of multiple pluggable databases.

Each pluggable database includes its own database dictionary. Pluggable Database PDB 120 includes Database Dictionary 121, Pluggable Database PDB 130 includes Database Dictionary 131, and Pluggable Database PDB 140 includes Database Dictionary 141. Similar to pluggable databases, Root Database 110 includes Database Dictionary 111. Database Dictionary 111 contains metadata that defines various aspects of Container Database 104 needed to administer Container Database 104 and the pluggable databases contained therein, including metadata that defines Pluggable Database PDB 120, Pluggable Database PDB 130, and Pluggable Database PDB 140.

Redo and Undo Records

Container Database 104 contains Redo Logs 150 and Global Undo Logs 152. Redo Logs 150 store redo records generated by transactions executed by Container DBMS 100 and Global Undo Logs 152 store undo records generated by the transactions. A redo record records enough information so that a database change may be redone to a database while an undo record records enough information about a database change so that the change in the database may be undone.

According to an embodiment, Redo Logs 150 hold redo records for multiple databases within Container Database 104. These databases include Pluggable Database PDB 120, Pluggable Database PDB 130, and Pluggable Database PDB 140, and Root Database 110.

A DBMS generates many redo records. A redo log has a finite size, and can only be used for a limited period of time to store new redo records as the redo records are generated by a DBMS. Generally, when a redo log reaches a threshold size, the redo log is no longer used to store redo records. Instead, new redo records are stored in another redo log as the redo records are generated. A redo log in which new redo records are stored as generated is referred to herein as a current redo log. Once a redo log is no longer used to store new redo logs, the redo log is referred to as an archived redo log.

Undo records can be used for a variety of purposes, such as rolling back transactions, recovering the database, providing read consistency, etc. Global Undo Logs 152 are of a finite size. Unlike redo records, undo records may not be retained in archive logs. Database Server 102 may overwrite the undo records as the transactions execute to save storage space.

When overwriting undo records, "minimum undo availability" is maintained. Minimum undo availability ensures availability of undo records for at least as long the corresponding transactions are active, guaranteeing that undo records needed to roll back an aborted transaction are available. Database Server 102 may also retain the undo records beyond longer than needed for minimum undo availability, to provide read consistency for longer running queries.

According to an embodiment, Global Undo Logs 152 hold undo records for multiple databases within Container Database 104. These databases include Pluggable Database PDB 120, Pluggable Database PDB 130, and Pluggable Database PDB 140, and Root Database 110.

In an approach to Rapid Pluggable Database Transportation, undo records generated for a pluggable database being transported are not stored in Global Undo Logs 152 but are instead stored separately in an undo log referred to as a local undo log with respect to the pluggable database. Local Undo Log 142 holds undo records generated by Database Server 102 for changes made to Pluggable Database PDB 140 but does not hold undo records for changes made to other pluggable databases in Container DBMS 100, during a phase of an approach to Rapid Pluggable Database Transportation, as shall be explained in greater detail.

Redo records and undo records record events other than database changes. Such events include transaction related events, such as, the commencement, commit or abort of a transaction.

A redo record or an undo record holds or is otherwise associated with a logical time that reflects the order in which the respective recorded event or change occurs relative to other events and changes recorded by other redo records and undo records. In addition, a transaction is also associated with a logical time denoting when the transaction was commenced; a redo record is generated to record the commencement of the transaction. An example of a logical time is a system change number (SCN). However, the present invention is not limited to a logical time in the form of an SCN.

Rapid Pluggable Database Transportation

Figure 2:
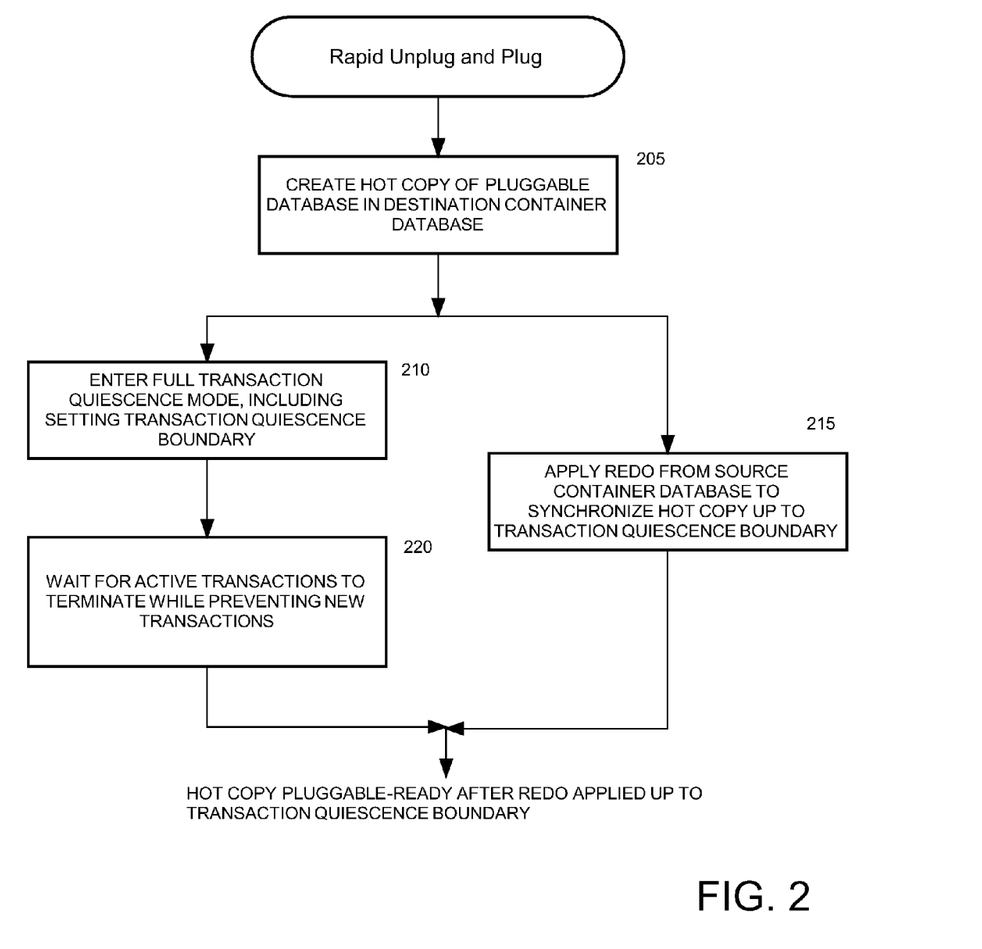
FIG. 2 is a flowchart showing operations performed for transporting a pluggable database according to an embodiment of the present invention.

FIG. 2 is a flow chart depicting a procedure to an approach for Rapid Pluggable Database Transportation, according to an embodiment of the present invention. The procedure is performed to transport a pluggable database from a "source Container DBMS" to a "destination Container DBMS", where the source container DBMS is Container DBMS 100. The destination container DBMS is not illustrated. After completion of the procedure, the transported pluggable database is "pluggable-ready", that is, the pluggable database is in the database state needed to be plugged into the destination container DBMS. A pluggable database being transported using Rapid Pluggable Database Transportation is referred to herein as a transported pluggable database.

Referring to FIG. 2, at 205, a hot copy of the transportable pluggable database Pluggable Database PDB 140 is created in the destination container DBMS. The copy of the transportable Pluggable Database PDB 140 is referred to herein as a hot copy because changes are permitted to Pluggable Database PDB 140 at the source Container DBMS 100 while being copied to the destination container DBMS. Thus, transactions are executed and changes of the transaction are committed to Pluggable Database PDB 140 as the Pluggable Database PDB 140 is being copied. After a portion of Pluggable Database PDB 140 has been copied to the destination container DBMS, the portion may be changed by a transaction. As shall be explained in greater detail, the changed portions are brought "up-to-date" by applying redo records at the destination container DBMS. A hot copy may comprise multiple files.

A database, such as a pluggable database, is associated with a check point representing the logical time at which any database change at or before the logical time has been written persistently to the database. When creation of the hot copy is commenced, the check point of transported Pluggable Database PDB 140 is recorded as the hot copy check point.

At step 210, the source container DBMS enters full transaction quiescence mode. In full transaction quiescence mode, no new transactions against the transported pluggable database may be initiated and the source container DBMS waits until full transaction inactivity is reached. When full transaction inactivity for a pluggable database is reached, no active transactions are being executed against the pluggable database; transactions that are active when full transaction quiescence mode is entered have terminated, that is, have been committed or aborted. The source Container DBMS 100 prevents or otherwise does not allow new transactions to be initiated against the transported Pluggable Database PDB 140.

Entering full transaction quiescence mode also entails setting a transaction quiescence boundary. The transaction quiescence boundary is a logical time where (1) all transactions initiated at or before the logical time against the transported pluggable database are terminated and (2) no new have transactions are initiated.

At step 220, the source container DBMS remains in full transaction quiescence mode, waiting for the active transactions to terminate. Meanwhile, transactions issued against other pluggable databases, e.g., Pluggable Database PDB 120 and Pluggable Database PDB 130, are permitted to initiate and execute.

While operations 210 and 220 are performed, at 215, the hot copy is synchronized to the transported pluggable database Pluggable Database PDB 140 by applying "pertinent redo records". Pertinent redo records are records recording changes and events that need to be applied to a database or otherwise replayed to synchronize the state of a database to a particular logical time. In the current procedure, the pertinent redo records are redo records having a logical time on or after the hot copy checkpoint. In step 215, pertinent redo records of transactions initiated at a logical time up to the transaction quiescence boundary are applied to the hot copy.

There may be several sources of pertinent records. Some pertinent redo records may reside in an archive redo log. The destination container DBMS accesses any archive log containing pertinent redo records to apply to the hot copy. Some pertinent redo records may reside in current redo logs. Current redo logs that have pertinent redo records are accessed by the destination container DBMS to apply these redo records to the hot copy. Some or all pertinent redo logs from the current redo logs may be shipped by the source container DBMS to the destination container DBMS without the destination container DBMS directly accessing the current redo logs. While synchronizing the hot copy, the source database may generate pertinent redo records that may need to be applied. These are shipped to or accessed from current redo log by the destination container DBMS.

Once the pertinent redo records for the transactions initiated before the transaction quiescence boundary are applied, the hot copy is pluggable-ready, and it may be plugged into the destination container DBMS. Once plugged-in, the destination DBMS permits execution of new transactions on the destination container DBMS against the hot copy, which in effect becomes Pluggable Database Pluggable Database PDB 140, but now hosted by the destination container DBMS.

Reaching full transaction inactivity is an important feature of the above procedure for Rapid Pluggable Database Transportation. A benefit of reaching full transaction inactivity in the source container database is that minimum undo availability is assured for transactions executed at the destination container DBMS against the transported pluggable once the transported pluggable database is opened at the target container DBMS. Because full transaction inactivity is reached at the source container DBMS before the transported pluggable database is opened at the destination container DBMS for execution of transactions, any transaction executed at the destination container DBMS against the transported pluggable database must have been initiated at the destination container DBMS, and thus all the undo records generated for the transactions are generated and available at the destination container DBMS. A disadvantage is no new transactions can be issued against the transported pluggable database during full transaction quiescence mode and thus the transported pluggable database is unavailable for a period of time for new transactions.

Partial Transaction Quiscence

Figure 3:
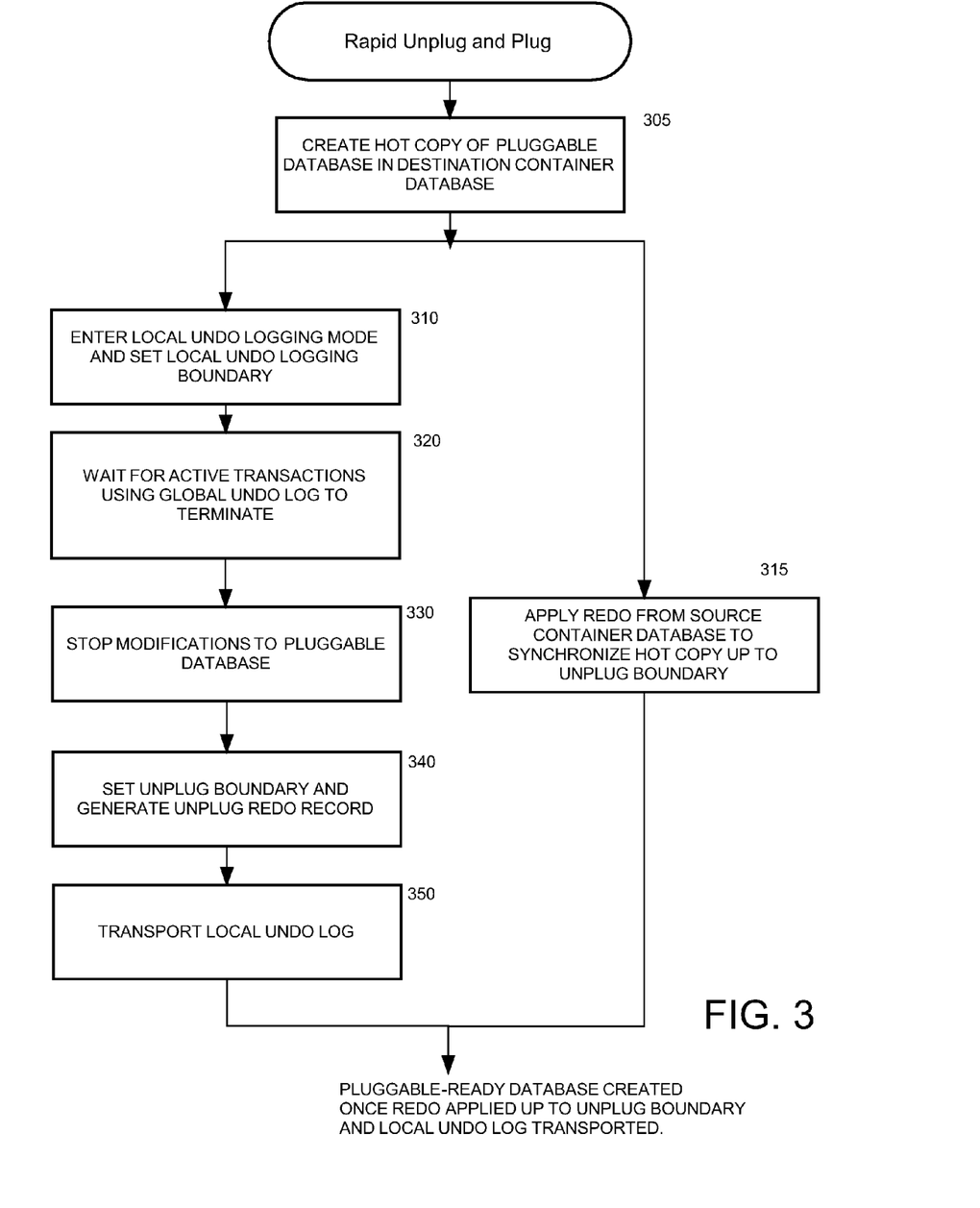
FIG. 3 is a flowchart showing operations performed for transporting a pluggable database according to an embodiment of the present invention.

FIG. 3 shows a procedure for Rapid Pluggable Database Transportation that enables minimization of the period of time a transported pluggable database is unavailable for initiating transactions. The procedure uses a local undo log for the transported pluggable database during Rapid Pluggable Database Transportation. The procedure is performed to transport a pluggable database from a source Container DBMS to a destination Container DBMS, where the source container DBMS is Container DBMS 100. The destination container DBMS is not illustrated. The pluggable database being transported is Pluggable Database PDB 140.

Referring to FIG. 3, a hot copy of the transportable pluggable database Pluggable Database PDB 140 is created in the destination container DBMS. When creation of the hot copy is commenced, the check point of transported Pluggable Database PDB 140 is recorded as the hot copy check point.

At step 310, source container DBMS 100 enters local undo logging mode for Pluggable Database PDB 140. For transactions initiated against Pluggable Database PDB 140 while source container DBMS is in local undo logging mode, the undo records are stored in the local undo log of Pluggable Database PDB 140, Local Undo Log 142. However, for transactions that are already active when source container DBMS 100 enters local undo log mode, the undo records are stored in Global Undo Logs 152.

When container DBMS 100 enters local undo logging mode, Container DBMS 100 sets a local undo logging boundary. The local undo logging boundary is a logical time where, for all transactions initiated before the logical time against the transported pluggable database, the undo records are stored in Global Undo Logs 152, and for transactions initiated after the logical time, the undo records are stored in Local Undo Log 142. Active transactions initiated against the transported pluggable database before the local undo logging boundary database are referred to herein as pre-local-logging transactions and transactions initiated against the transported pluggable database after the local undo logging boundary database are referred to herein as post-local-logging transactions. Thus, even though local undo logging mode has been entered for Pluggable Database PDB 140, undo records for changes made by pre-local-logging transactions during local undo logging mode are stored in Global Undo Logs 152.

At 320, the source container DBMS 100, in local undo logging mode, waits for pre-local-logging transactions to terminate. However, transactions initiated after undo local logging boundary are permitted to execute.

At 330, the source container DBMS 100 detects that the pre-local logging transactions have terminated. In response to detecting that the pre-local logging transactions have terminated, the source container DBMS suspends execution of transactions to the transported Pluggable Database PDB 140, thereby preventing further changes to Pluggable Database PDB 140.

At step 340, source Container DBMS 100 sets the "unplug boundary". The unplug boundary is the logical time at which no further changes are made to the transported pluggable database at source Container DBMS 100. The source Container DBMS 100 generates an "unplug redo record" recording the occurrence of the unplug boundary and the logical time of the unplug boundary.

At step 350, the local undo log is transported to the destination container DBMS by, for example, source container DBMS 100 sending the Local Undo Log 142 to the destination container DBMS.

While steps 310 through 350 are performed, at 315, the hot copy is synchronized to the transported pluggable database Pluggable Database PDB 140 by applying "pertinent redo records". The synchronization of the hot copy is performed as similarly described in step 215, except the pertinent redo records are applied up to the unplug redo record. Once the destination container DBMS reaches the unplug redo record, the destination container DBMS ceases to apply redo records.

Once synchronization of the hot copy is complete and Local Undo Log 142 is transported to the destination container DBMS, the hot copy is pluggable-ready.

Once the hot copy is pluggable-ready, it may be plugged into the destination container DBMS. Once plugged in, post-local logging transactions that are active at the unplug boundary may begin execution at the destination container DBMS; undo records for these pre-local logging transactions are available if needed. New transactions also may begin to execute.

In one embodiment, the local undo log is part of the hot copy that is copied into the destination container DBMS and is brought to the pluggable-ready state by applying redo records to local undo log at the destination containter DBMS.

Database System Overview

Embodiments of the present invention are used in the context of DBMSs. Therefore, a description of a DBMS is useful.

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
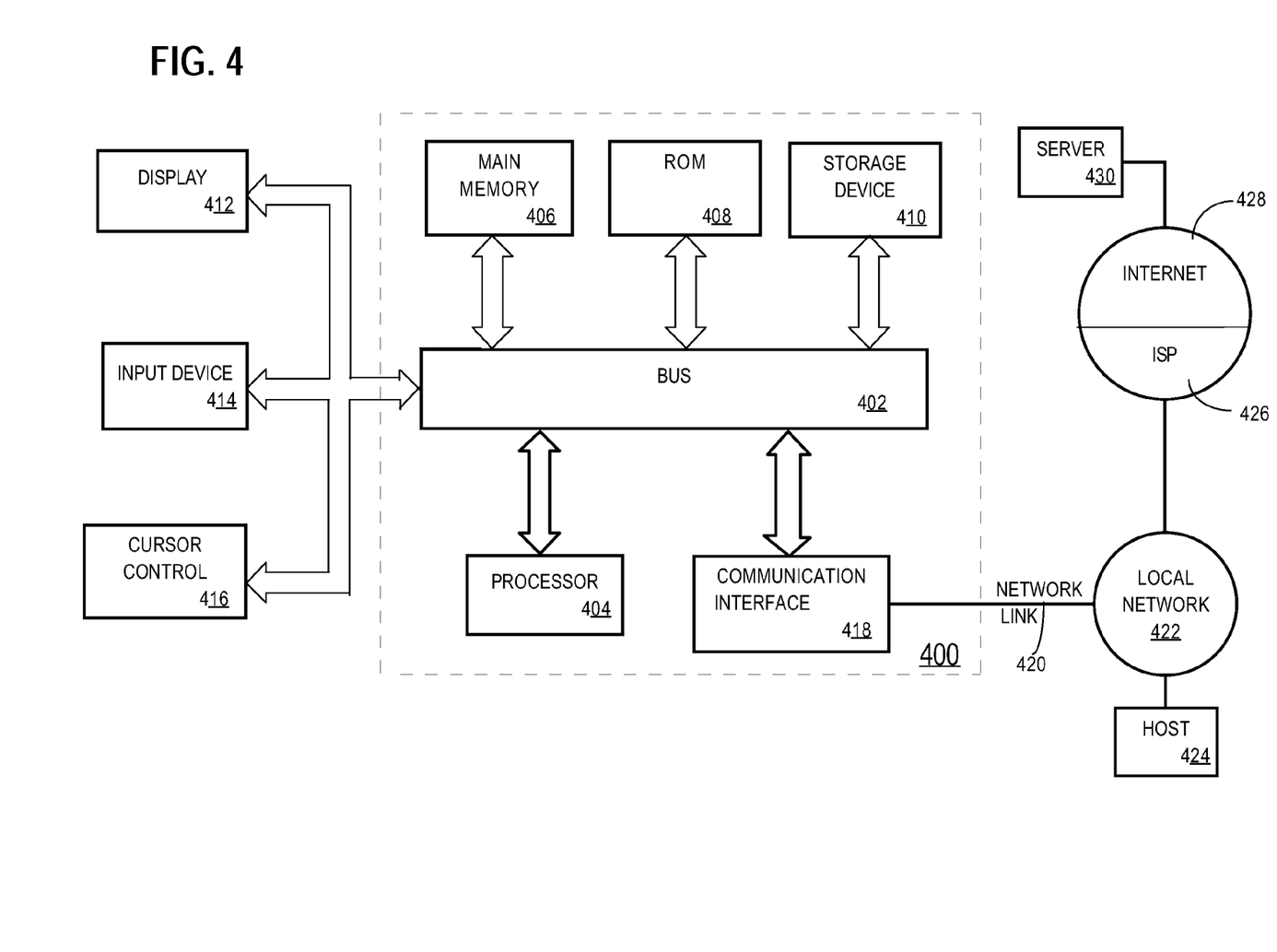
FIG. 4 is a diagram depicting a computer system that may be used in an embodiment of the present invention.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising steps of:
    at a destination DBMS, generating a copy of a pluggable database hosted on a source DBMS;
    while generating said copy:
        executing first transactions issued against said pluggable database,
        generating first redo records that record changes made by said first transactions to said pluggable database, and
        preventing initiation of second transactions against said pluggable database;
    said destination DBMS applying said first redo records to said copy; and
    after applying said first redo records to said copy and said first transactions terminate:
        plugging in said copy into said destination DBMS, and
        after plugging in said copy, said destination DBMS permitting initiation of transactions against said copy.

2. The method of claim 1, wherein the steps further include said source DBMS transmitting at least a portion of said first redo records to said destination DBMS while said generating said copy.

3. The method of claim 1, wherein said pluggable database belongs to a container database hosted by said source DBMS, said container database comprising one or more other pluggable databases.

4. The method of claim 3, wherein the steps further include permitting initiation of other transactions against said one or more other pluggable databases while said preventing initiation of second transactions against said pluggable database.

5. The method of claim 1, wherein said preventing initiation of second transactions against said pluggable database is begun after generating at least a portion of said copy.

6. A method, comprising:
at a destination DBMS, generating a copy of a pluggable database hosted on a source DBMS;
while generating said copy:
executing first transactions issued against said pluggable database,
generating first redo records that record changes made by said first transactions to said pluggable database,
storing undo records for said first transactions in a first undo log that stores undo records generated for one or more other pluggable databases hosted by said source DBMS,
executing second transactions issued against said pluggable database,
generating second redo records that record changes made by said second transactions to said pluggable database, and
storing undo records for said second transactions in a second undo log that stores undo records generated for said second transactions but not said first transactions;
determining that said first transactions are terminated;
in response to determining that said first transactions are terminated:
ceasing to execute said second transactions without terminating said second transactions,
establishing an unplug boundary; and
said destination DBMS applying said first redo records and said second redo records up to said unplug boundary.

7. The method of claim 6, further including transporting said second undo log to said destination DBMS.

8. The method of claim 6, wherein generating said copy includes generating a hot copy that includes said second undo log.

9. The method of claim 6, wherein any undo record stored in said second undo log records changes only for said pluggable database.

10. The method of claim 6, wherein said pluggable database belongs to a container database hosted by said source DBMS, said container database comprising said one or more other pluggable databases.

11. The method of claim 6, further including the step of said destination DBMS transmitting at least a portion of said first redo records to said destination DBMS while said generating said copy.

12. The method of claim 6, wherein:
establishing an unplug boundary includes generating a particular redo record that records a logical time representing a transaction quiescence boundary; and
wherein applying said first redo records and said second redo records includes applying said second redo records until said particular redo record is encountered.

13. One or more non-transitory storage media storing instructions which, when executed by one or more computing devices, cause:
at a destination DBMS, generating a copy of a pluggable database hosted on a source DBMS;
while generating said copy:
executing first transactions issued against said pluggable database,
generating first redo records that record changes made by said first transactions to said pluggable database, and
preventing initiation of second transactions against said pluggable database;
said destination DBMS applying said first redo records to said copy;
after applying said first redo records to said copy and said first transactions terminate:
plugging in said copy into said destination DBMS, and
after plugging in said copy, said destination DBMS permitting initiation of transactions against said copy.

14. The one or more non-transitory storage media of claim 13, wherein the instructions include instructions, that when executed by said one or more computing devices, cause said source DBMS transmitting at least a portion of said first redo records to said destination DBMS while said generating said copy.

15. The one or more non-transitory storage media of claim 13, wherein said pluggable database belongs to a container database hosted by said source DBMS, said container database comprising one or more other pluggable databases.

16. The one or more non-transitory storage media of claim 15, wherein the instructions include instructions, that when executed by said one or more computing devices, cause permitting initiation of other transactions against said one or more other pluggable databases while said preventing initiation of second transactions against said pluggable database.

17. One or more non-transitory storage media storing instructions, which when executed by one or more computing devices, cause:
at a destination DBMS, generating a copy of a pluggable database hosted on a source DBMS;
while generating said copy:
executing first transactions issued against said pluggable database,
generating first redo records that record changes made by said first transactions to said pluggable database,
storing undo records for said first transactions in a first undo log that stores undo records generated for one or more other pluggable databases hosted by said source DBMS,
executing second transactions issued against said pluggable database,
generating second redo records that record changes made by said second transactions to said pluggable database, and
storing undo records for said second transactions in a second undo log that stores undo records generated for said second transactions but not said first transactions;
determining that said first transactions are terminated;
in response to determining that said first transactions are terminated:
ceasing to execute said second transactions without terminating said second transactions, and
establishing an unplug boundary; and
said destination DBMS applying said first redo records and said second redo records up to said unplug boundary.

18. The one or more non-transitory storage media of claim 17, wherein the instructions include instructions, that when executed by said one or more computing devices, cause transporting said second undo log to said destination DBMS.

19. The one or more non-transitory storage media of claim 17, wherein generating said copy includes generating a hot copy that includes said second undo log.

20. The one or more non-transitory storage media of claim 17, wherein any undo record stored in said second undo log records changes only for said pluggable database.

21. The one or more non-transitory storage media of claim 17, wherein said pluggable database belongs to a container database hosted by said source DBMS, said container database comprising said one or more other pluggable databases.

22. The one or more non-transitory storage media of claim 17, wherein the instructions include instructions, that when executed by said one or more computing devices, cause said destination DBMS transmitting at least a portion of said first redo records to said destination DBMS while said generating said copy.

23. The one or more non-transitory storage media of claim 17, wherein:
    establishing an unplug boundary includes generating a particular redo record that records a logical time representing a transaction quiescence boundary; and
    wherein applying said first redo records and said second redo records includes applying said second redo records until said particular redo record is encountered.

24. The one or more non-transitory storage media of claim 17, wherein said preventing initiation of second transactions against said pluggable database is begun after generating at least a portion of said copy.

* * * * *